(12) United States Patent
Anderson

(10) Patent No.: US 11,518,140 B2
(45) Date of Patent: Dec. 6, 2022

(54) BODY AND HAIR TOWEL

(71) Applicant: Sherry Anderson, Stafford, VA (US)

(72) Inventor: Sherry Anderson, Stafford, VA (US)

(*) Notice: Subject to any disclaimer, the term of this patent is extended or adjusted under 35 U.S.C. 154(b) by 0 days.

(21) Appl. No.: 17/213,334

(22) Filed: Mar. 26, 2021

(65) Prior Publication Data
US 2022/0152974 A1    May 19, 2022

Related U.S. Application Data

(60) Provisional application No. 63/113,514, filed on Nov. 13, 2020.

(51) Int. Cl.
| | | |
|---|---|---|
| *B32B 5/26* | (2006.01) | |
| *B32B 5/02* | (2006.01) | |
| *B32B 7/09* | (2019.01) | |
| *D03D 1/00* | (2006.01) | |
| *D03D 11/00* | (2006.01) | |
| *A47K 10/02* | (2006.01) | |
| *D03D 15/33* | (2021.01) | |
| *D03D 27/08* | (2006.01) | |
| *D03D 15/58* | (2021.01) | |

(52) U.S. Cl.
CPC ............... *B32B 5/26* (2013.01); *A47K 10/02* (2013.01); *B32B 5/024* (2013.01); *B32B 7/09* (2019.01); *D03D 1/0017* (2013.01); *D03D 11/00* (2013.01); *D03D 15/33* (2021.01); *D03D 15/58* (2021.01); *D03D 27/08* (2013.01); *B32B 2262/0253* (2013.01); *B32B 2262/0261* (2013.01); *B32B 2262/0276* (2013.01); *B32B 2262/08* (2013.01); *B32B 2307/72* (2013.01)

(58) Field of Classification Search
CPC .................................. B32B 5/26; D03D 15/33
See application file for complete search history.

(56) References Cited

U.S. PATENT DOCUMENTS

| | | | | |
|---|---|---|---|---|
| 2004/0055659 A1* | 3/2004 | Hugh Silver | .......... | A47K 10/02 139/396 |
| 2005/0044650 A1* | 3/2005 | Goldberg | ................ | A47L 13/20 15/229.1 |
| 2009/0176049 A1* | 7/2009 | Maughn-Haas | ....... | A47K 10/02 428/68 |
| 2009/0317584 A1* | 12/2009 | Ivanoff | .................. | D03D 27/08 428/95 |
| 2016/0029718 A1* | 2/2016 | Darnell | .................. | A47G 9/062 34/91 |

* cited by examiner

*Primary Examiner* — Tong Guo
(74) *Attorney, Agent, or Firm* — Brennan, Manna & Diamond, LLC

(57) ABSTRACT

The present invention relates to a body and hair towel comprising a microfiber interior layer and a silk exterior layer. The novel towel is comprised of a plurality of double layered capsules, wherein each capsule has an interior layer of microfiber material and an exterior layer of silk material. The exterior silk layer on the capsules provides an extremely smooth texture to the towel, thereby making the towel comfortable and convenient to use by people having dry skin, skin conditions or the like, and may also be comfortably used on hair without affecting the health of hair and skin of the users.

5 Claims, 4 Drawing Sheets

BODY AND HAIR TOWEL

CROSS-REFERENCE TO RELATED APPLICATION

The present application claims priority to, and the benefit of, U.S. Provisional Application No. 63/113,514, which was filed on Nov. 13, 2020 and is incorporated herein by reference in its entirety.

FIELD OF THE INVENTION

The present invention relates generally to the field of hair drying and personal grooming accessories. More specifically, the present invention relates to a body and hair towel comprising a microfiber interior layer and a silk exterior layer. The novel towel offers a soft comforting feeling to the skin while drying without irritating skin tags, rashes, dry skin or conditions such as eczema. Additionally, the novel towel can be used to dry hair without any pulling or friction on the user's hair, thereby resulting in healthier strands and length with reduced frizz. The novel towel replaces the need for conventional terry cloth, cotton or other synthetic and natural fiber blend towels in the bathroom and salons. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, most individuals utilize terry cloth towels, cotton towels, or other synthetic and natural fiber blend towels or cloths to dry their body and hair after getting out of the bath, shower, pool or hot tub, or when coming in from the rain. A terry cloth towel is a fabric woven with many protruding loops of thread, which can absorb large amounts of water when drying a wet body or hair or any other surface. Most terry cloth towels are typically comprised of 100% cotton, but may sometimes also contain polyester or other synthetic or natural fibers. Conventional terry cloth towels tend to be rough on the user's skin, particularly after the towel has been laundered many times and may cause irritation to the user's skin. Additionally, due to the relatively rough texture of most terry cloth towels, individuals suffering from skin rashes, irritation and other skin related problems may experience extreme discomfort when using a terry cloth towel. Terry cloth towels can also be extremely irritating for individuals suffering from dry skin.

Additionally, individuals suffering from a skin disease such as eczema that causes inflamed, itchy, cracked, and rough skin may not be comfortable using a conventional terry cloth towel after a bath or shower. This is true because the relatively rough texture of the terry cloth towel tends to irritate and pull at the skin tags and other rough or cracked skin, thereby leaving severe rashes, scabs, burns, sores or scars on the surface of the skin of the individual.

Furthermore, individuals that use a terry cloth towel to dry their wet hair may cause the hair to become frizzy or otherwise damaged due to the rubbing of a rough towel texture against the hair. The hair may also be pulled when the individual strands get caught in the rough texture of the towel, which may result in discomfort to the user or cause the hair to be pulled out of the scalp. The overall health of the individual's hair also suffers due to the pulling and friction caused by the towel.

Due to pulling of the hair by terry cloth towels, some individuals may only use the terry cloth towel slowly, which increases the overall time to dry the individual's hair and is inefficient. Conventional terry cloth towels may also cause an allergic reaction in some individuals. Additionally, because material used in terry cloth towels is relatively delicate, it may become easily damaged after several uses and laundering, thereby causing the terry cloth towel to look unattractive to the user.

In an effort to avoid the use of terry cloth towels for the above reasons, some individuals use cotton towels to dry their body and/or hair. Most cotton towels are relatively lightweight and easily absorb water. However, most cotton towels become extremely wet after a single use and the towel becomes heavy when wet. Also, cotton towels don't wring out as easily as terry cloth towels and tend to hold on to moisture for a longer period of time, which is undesirable. Further, conventional cotton towels are easily prone to damage as the natural fibers in cotton fabric are more susceptible to wearing out more quickly than synthetic options or other fiber blends. Therefore, many individuals are also not comfortable using conventional cotton towels to dry their body and/or hair.

Therefore, there exists a long felt need in the art for a body and hair towel that is relatively smooth in texture, and that can be used to easily dry an individual's body and/or hair after a bath or shower. Additionally, there is a long felt need in the art for a body and hair towel that is comfortable to use, and that does not pull at the user's hair when used to dry hair. Further, there is a long felt need in the art for a body and hair towel that can be comfortably used by individuals already suffering from skin diseases, such as eczema, psoriasis, dry skin, etc., and that does not pull any exposed skin tags. Moreover, there is a long felt need in the art for a body and hair towel that exhibits enhanced drying capabilities without becoming overly wet after a first use, thereby decreasing the amount of time it takes for the user to dry off. Finally, there is a long felt need in the art for a body and hair towel that is relatively inexpensive to manufacture and that is both safe and easy to use.

The subject matter disclosed and claimed herein, in one embodiment thereof, comprises a combination body and hair towel for use to dry the wet hair and skin of an individual. The novel body and hair towel is comprised of a plurality of double layered capsules, wherein each capsule has an interior layer of microfiber material and an exterior layer of silk material. The exterior silk layer on the capsules provides an extremely smooth texture to the towel of the present invention, thereby making the towel comfortable and convenient to use by people having dry skin, skin conditions or the like, and may also be comfortably used on hair without affecting the health of hair and skin of the users.

In this manner, the novel silk body and hair towel of the present invention accomplishes all of the forgoing objectives, and provides a relatively comfortable, convenient and effective solution for drying one's body and hair after coming from a bath, shower, pool, hot tub, etc. The silk body and hair towel of the present invention is also user friendly, as the towel features a smooth and soft texture, which prevents pulling of any skin tags or hair while in use, and therefore does not affect the skin and hair health of the user. The silk body and hair towel is attractive, highly absorbent and replaces the need for conventional terry cloth or cotton towels used in bathrooms, bathhouses and salons.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a body and hair towel for use in drying an individual's body and hair after coming from a bath, shower, pool, hot tub or the like. The combination body and hair towel has a plurality of double layered capsules, wherein each capsule is comprised of an interior layer comprised of a microfiber material and an exterior layer comprised of a silk material. The exterior silk layer provides an extremely smooth texture to the towel of the present invention, thereby making the towel comfortable and convenient to use by people having a skin condition or skin tags, and may also be comfortably used on hair, without pulling at the hair when in use. The silk layer may be bonded to the microfiber layer, or the layers may be unbonded, thereby creating a small air gap between the respective layers which will help to facilitate drying of the towel after use and/or washing the same.

In a further embodiment of the present invention, a moisture absorbing towel for drying an individual's wet hair and body is disclosed. The moisture absorbing towel has a base layer comprised of a cloth and a plurality of capsules knitted over the base layer or woven to the base layer, wherein each of the plurality of capsules has a bottom end which is attached to the base layer and a tip end which is used against the surface of the hair or skin for drying or wicking off moisture therefrom. Each of the capsules are double layered and comprise an interior layer made of a material such as microfiber, and an exterior layer made of a relatively smooth material such as silk or the like.

In yet another embodiment of the present invention, a silk body and hair towel for drying wet hair and the body is disclosed. The towel comprises a base fabric comprised of a longitudinal warp yarn, a transverse weft drawn through and inserted over-and-under the warp, and a plurality of capsules knitted over the base fabric surface. Each of the capsules is comprised of an interior microfiber layer and an exterior silk layer. The materials chosen to form the capsules of the body and hair towel makes the towel hypoallergenic to the skin. Additionally, the silk based outer texture make the towel extremely soft and smooth to use, while providing a lustrous appearance to the towel.

In a still further embodiment of the present invention, a method for making a towel is disclosed and includes the steps of initially weaving a base layer and then weaving a microfiber layer over the base layer to create a plurality of tufts extending generally upward from the base layer. Next, an outer layer is attached over the microfiber layer and a plurality of individual capsules are created on the base layer.

In a further embodiment of the present invention, a hair and body towel for absorbing moisture on the body and the hair after bathing, swimming, etc. is disclosed. The novel hair and body towel comprises a substantially rectangular shaped base fabric having a plurality of capsules sewn, knitted or woven onto the base fabric. The capsules are sewn side by side to cover the complete surface of the base fabric, and each of the capsules includes a microfiber inner layer overlapped with a silk outer layer.

In yet still a further embodiment of the present invention, a personal grooming accessory is disclosed. The personal grooming accessory comprises a base layer formed from a fabric, a first layer and a second layer. The first layer is woven to the base layer, wherein the first layer has a plurality of fibers extending generally upwardly from the base layer. The second layer is disposed over the first layer, wherein the second layer fully covers the first layer and forms individual capsules over each of the plurality of fibers extending upwardly from the base layer.

The silk body and hair towel of the present invention is particularly advantageous as the towel is hypoallergenic and features a relatively smooth texture. The silk body and hair towel of the present invention dries the hair in less time than conventional towels, and without pulling the individual's hair or causing hair frizziness. Additionally, the relatively smooth texture of the silk body and hair towel can be comfortably used over skin without affecting skin tags or other lesions, thereby maintaining the hair and skin health of the users.

The body and hair towel of the present invention can be marketed as an individual product, or may be sold as a kit or package of washcloths, hand towels and beach towels, as per the desires and requirements of the user. The standard towel may be rectangular in shape and approximately 30"×56" in size. However, the shape and size of the towel of the present invention is not so limited, and the towel can be of any other shape and/or size as per the desires and requirements of the user.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
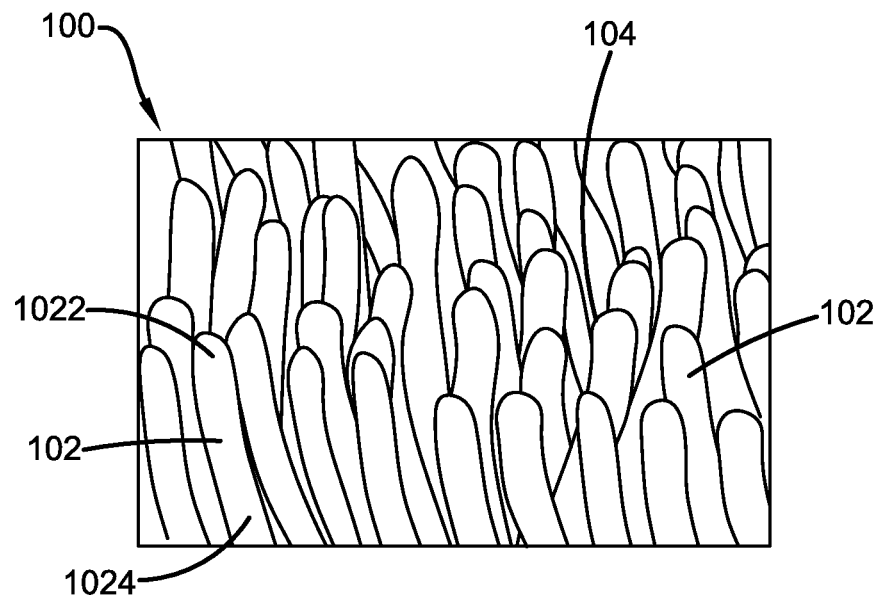
FIG. 1 illustrates a close up and partial perspective view of one potential embodiment of the surface of the body and hair towel of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a body and hair towel that is relatively smooth in texture, and that can be used to easily dry an individual's body and/or hair after a bath, shower, swimming pool or hot tub excursion. Additionally, there is a long felt need in the art for a body and hair towel that is comfortable to use, and that does not pull at the user's hair when used to dry hair. Further, there is a long felt need in the art for a body and hair towel that can be comfortably used by individuals already suffering from skin diseases, such as eczema, psoriasis, dry skin, etc., and that does not pull any exposed skin tags. Moreover, there is a long felt need in the art for a body and hair towel that exhibits enhanced drying capabilities without becoming overly wet after a first use, thereby decreasing the amount of time it takes for the user to dry off. Finally, there is a long felt need in the art for a body and hair towel that is relatively inexpensive to manufacture and that is both safe and easy to use.

The present invention, in one exemplary embodiment, is a novel body and hair towel for use in drying wet hair and skin of a user. The body and hair towel is comprised of a plurality of double layered capsules, wherein each capsule has an interior layer comprised of a microfiber material and an exterior layer comprised of a silk material. The exterior silk layer provides an extremely smooth texture having a relatively low coefficient of friction, thereby making the towel comfortable and convenient to use by people having dry skin, a skin condition or skin tags. The towel may also be comfortably used on hair, without pulling on the hair, etc.

The coefficient of friction of a fabric is measured by the tangent of an angle at which a block covered with fabric begins to slide due to its own weight when it is kept over the inclined surface covered with the same fabric. The angle of repose of the fabric of the towel of the present invention should be between 15 and 35 degrees, wherein the silk has a coefficient of friction ranging from 0.3 to 0.7. The cross section of the fabric strands can be circular, triangular or trilobal, and ideally would have a tight weave and a density ranging from 400 to 800 grams per square meter (GSM) with between 500 and 700 GSM being preferred. The towel should use relatively long staple silk fibers between 1.1 and 1.4 inches to provide enhanced ability to dry and absorb water. The silk fibers should be a zero twist or looped. The microfibers used in the capsule of the present invention are preferably selected from polyester or nylon. The fabric coefficient of friction is measured in accordance with the ASTM D1894 standard, wherein the silk outer layer has a different coefficient of friction than the inner core microfiber which ranges from about 0.6 to 0.8.

Referring initially to the drawings, FIG. 1 illustrates a close up and partial perspective view of one potential embodiment of the surface of the body and hair towel 100 of the present invention in accordance with the disclosed architecture. The body and hair towel 100 comprises a base fabric 104 having a plurality of double layered or walled capsules 102. The base fabric 104 is woven by holding a longitudinal warp yarn on a frame, with a transverse weft drawn through and inserted over and under the warp. The base 104 forms the shape of the towel 100, and may have a rectangular, square, circular or any other shape as per the desire of the user. The capsules 102 are weaved all over the surface of the base 104, wherein each capsule 102 is a protruding structure having a tip end 1022 and a bottom end 1024 and made up of two layers of material. The bottom end 1024 of the capsules 102 is attached to the surface of the base 104, and the tip end 1022 of the protruding structure is free and provides a smooth and soft texture of the towel 100. Each capsule 102 comprises an inner layer made up of a microfiber tight weave material and an outer layer made up of luster silk material. Both of the materials, namely microfiber and silk, are hypoallergenic to the skin of an individual, and suits the skin and hair of all individuals. The silk material strengthens hair strands, and limits frizziness. Additionally, the silk outer or exterior layer of the capsule 102 is durable, provides a lustrous surface and an aesthetically appealing look to the towel 100. The tip end 1022 of the capsules 102 is preferably rounded and provides a soft comforting feel to the skin when drying the same and will not irritate skin tags, dry skin, or skin conditions such as psoriasis or eczema. Additionally, the soft texture of the towel 100 prevents pulling of the user's hair while drying wet hair, and therefore enables the users to dry their hair in less time.

The body and hair towel 100 of the present invention may be generally rectangular in shape. However, the shape of the towel 100 is not so limited, and the towel 100 can be of other shapes such as, but not limited to a square, circular, oval, triangular, etc. The standard dimensions of the towel 100 are approximately 30" in width×56" in length, although any other size may also be used to satisfy user need and/or preference. The color of the towel 100 depends on the color of the outer layer of silk material, and can be red, blue, pink, green, white, black, or any other color that satisfies user need and/or preference.

Figure 2:
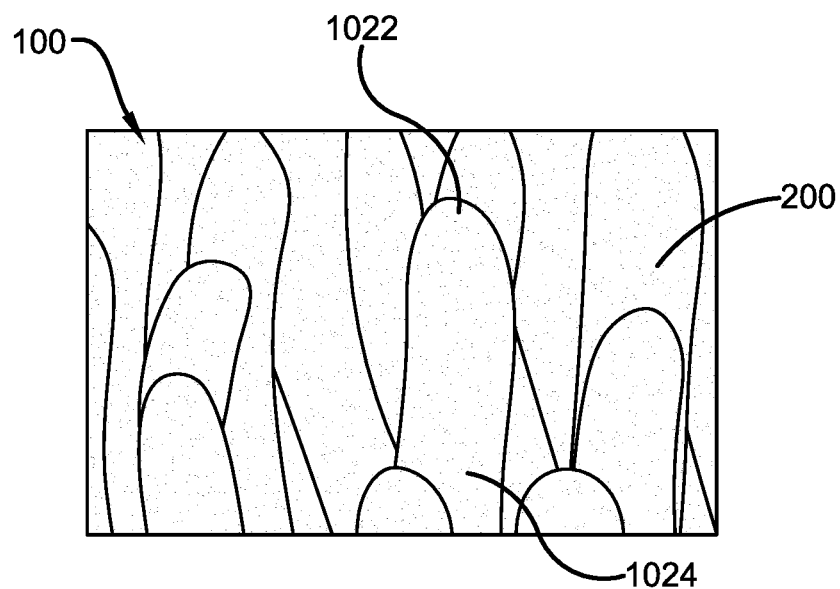
FIG. 2 illustrates a close up and partial perspective view of one potential embodiment of the inner layer of the body and hair towel of the present invention in accordance with the disclosed architecture.

FIG. 2 illustrates a close up and partial perspective view of one potential embodiment of the inner layer 200 of the body and hair towel 100 of the present invention in accordance with the disclosed architecture. As shown, each of the capsules 102 of the towel 100 is formed by a microfiber-based inner layer, overlapped with a silk-based outer layer. The inner layer 200 is formed by a plurality of protruding structures using the microfiber tight weave material. The microfiber is a tight weave made up of man-made fibers spun into a very fine yarn, and that creates an ultra-soft finish and provides excellent wrinkle resistance. Additionally, due to the tight weave, the microfiber fabric may also be allergen-proof. The microfiber inner layer 200 quickly absorbs water, and therefore enables the user to rapidly dry his or her hair and/or body. The microfiber inner layer 200 is also hypoallergenic, thereby allowing the towel 100 to be used by individuals with normal to sensitive skin types, skin conditions, skin tags and the like.

The microfiber is a synthetic fiber that is finer than one denier or decitex/thread, thereby having a diameter of less than ten micrometers. The microfiber may be produced using polyesters, polyamides (e.g., nylon, Kevlar, Nomex), and combinations of polyester, polyamide, and polypropylene. The microfiber dries the body and/or hair faster than alternative towels, and reduces frizz and hair breakdown. Additionally, the microfiber is easily and readily available in the marketplace, and is relatively inexpensive to procure and use.

Figure 3A:
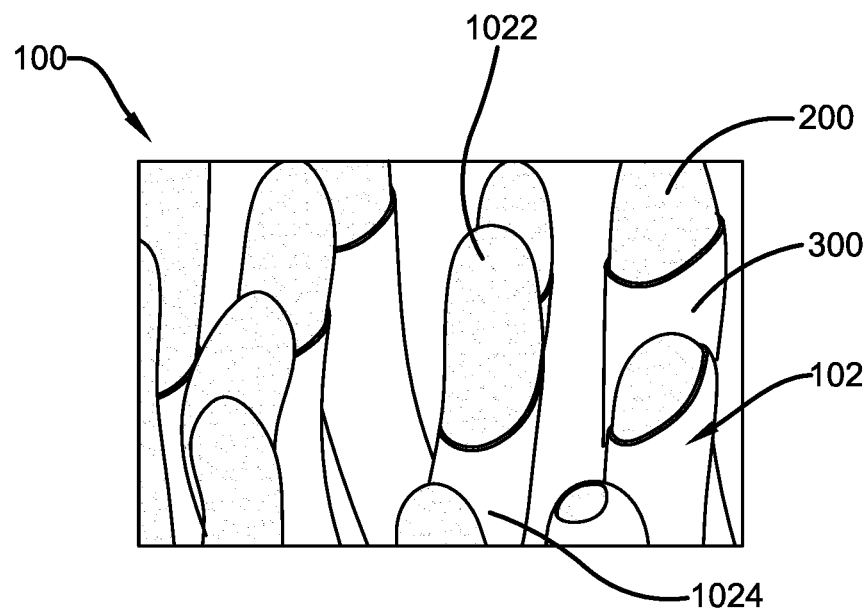
FIG. 3A illustrates a close up and partial perspective view of one potential embodiment of both layers of the body and hair towel of the present invention in accordance with the disclosed architecture.

FIG. 3A illustrates a close up and partial perspective view of one potential embodiment of both layers 200, 300 of the body and hair towel 100 of the present invention in accordance with the disclosed architecture. As shown, each of the capsules 102 includes an exterior layer 300 of silk material overlapped over an interior protruding structure 200 of microfiber material. The silk material for the outer layer 300 is preferably hypoallergenic, and therefore does not attract dust mites and is a natural fungal repellant. The silk material also provides a lustrous and shimmering appearance to the towel 100, thereby making the towel 100 aesthetically appealing to the user. The shimmering appearance of the silk material is due to the circular, triangular prism-like or trilobal structure of the silk fibers, which allows the silk cloth to refract incoming light at different angles, thereby producing different colors. Additionally, the silk material will strengthen the user's hair strands, retain healthy hair and limit frizziness.

Figure 3B:
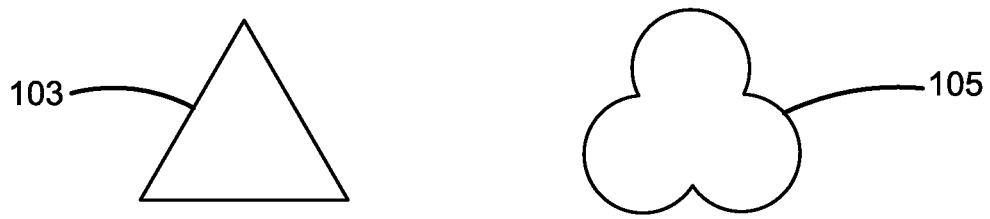
FIG. 3B illustrates a close up and partial perspective view of one potential embodiment of alternative fiber configurations, such as trilobal and triangular, of the body and hair towel of the present invention in accordance with the disclosed architecture.
Figure 3C:
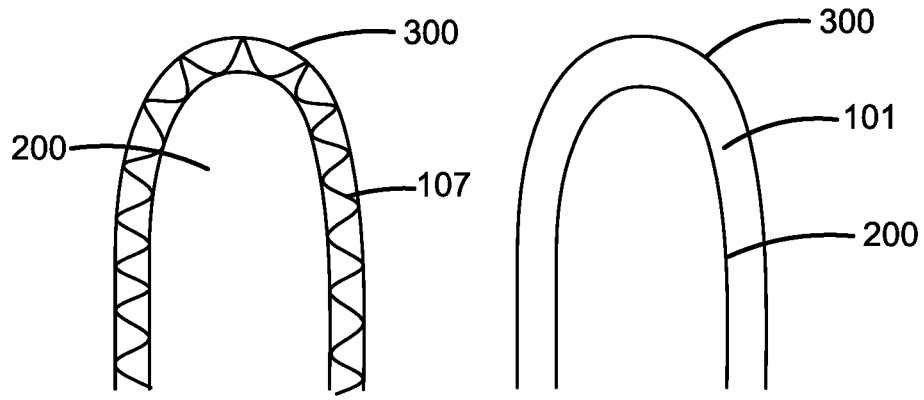
FIG. 3C illustrates a cross sectional view of one potential embodiment of the capsule of the body and hair towel of the present invention in accordance with the disclosed architecture, wherein the microfiber is in an attached and unattached configuration to the outer layer.

FIG. 3B illustrates a close up and partial perspective view of one potential embodiment of alternative fiber configurations, such as trilobal and triangular, of the body and hair towel 100 of the present invention in accordance with the disclosed architecture. More specifically, FIG. 3B shows the triangular shape 103 and the trilobal shape 105 of the plurality of capsules 102. Relatedly, FIG. 3C illustrates a cross sectional view of one potential embodiment of the capsule 102 of the body and hair towel 100 of the present invention in accordance with the disclosed architecture, wherein the microfiber is in an attached and unattached configuration to the outer layer 300. More specifically, the outer layer 300 covers the inner layer 200, wherein the inner and outer layers 200, 300 may be bonded to one another at 107, or may be free from one another to create an air space 101 between said layers 200, 300 to improve air flow and drying of the towel after use or being washed. The air space 101 may also increase the softness of the towel's outer layer 300.

Figure 4:
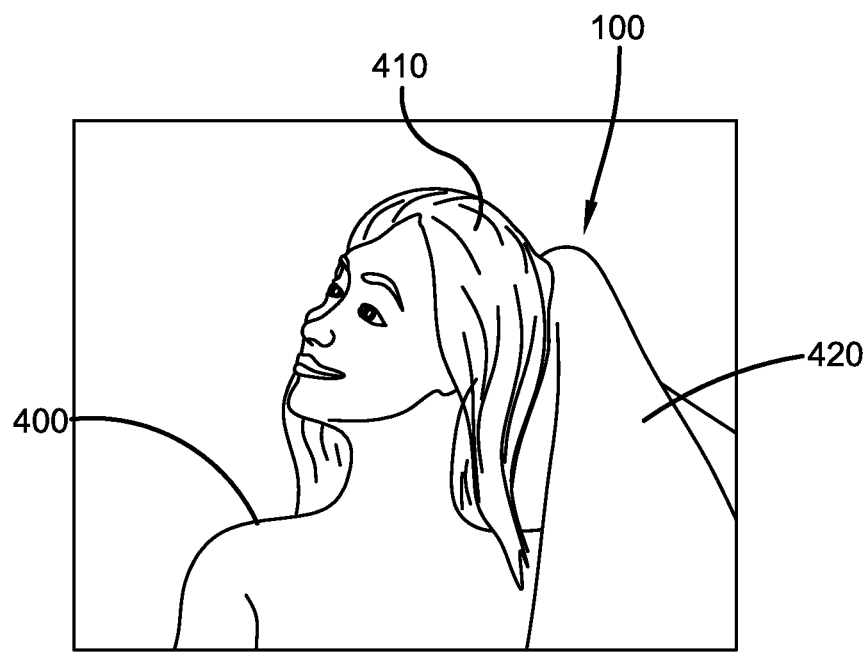
FIG. 4 illustrates a perspective view of one potential embodiment of the body and hair towel of the present invention in accordance with the disclosed architecture, wherein the body and hair towel is being used to dry the hair of a user.

FIG. 4 illustrates a perspective view of one potential embodiment of the body and hair towel 100 of the present invention in accordance with the disclosed architecture, wherein the body and hair towel 100 is being used to dry the hair 410 of a user 400. More specifically, a user 400 is holding the body and hair towel 100 in her hand 420 and is using the towel 100 to dry her wet hair 410 after, for example, a shower. The towel 100 can be easily rubbed over the user's head to dry the wet hair 410, and will not pull on or otherwise damage the hair 410. The towel 100 of the present invention is made up of super absorbent materials, and quickly absorbs the moisture from the hair 410 and body of the user 400.

Figure 5:
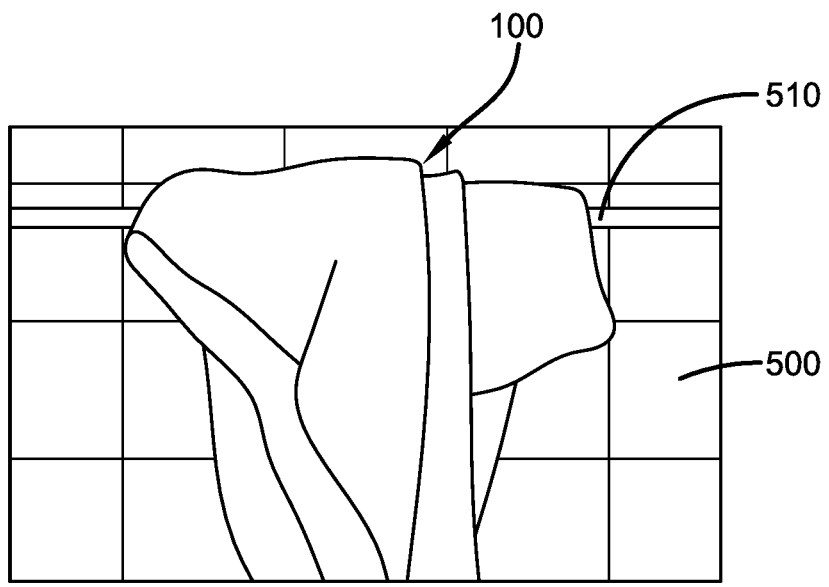
FIG. 5 illustrates a perspective view of one potential embodiment of the body and hair towel of the present invention in accordance with the disclosed architecture, wherein the body and hair towel is hung on a towel rack in a bathroom.

FIG. 5 illustrates a perspective view of one potential embodiment of the body and hair towel 100 of the present invention in accordance with the disclosed architecture, wherein the body and hair towel 100 is hung on a towel rack 510 in a bathroom 500. As shown, a user 400 can hang the towel 100 on a bar handle 510 in a bathroom 500 when not in use. Alternatively, the towel 100 may be hung on a hanging hook in the bathroom 500 so that it is readily accessible when needed by the user 400, for example, after having taken a bath or a shower. As noted above, the body and hair towel 100 can be of any shape and size as per the requirements of the user. The towel 100 may further include one or more logos, prints, designs, customized or personalized slogans or the like as per the desires of the users.

Figure 6:
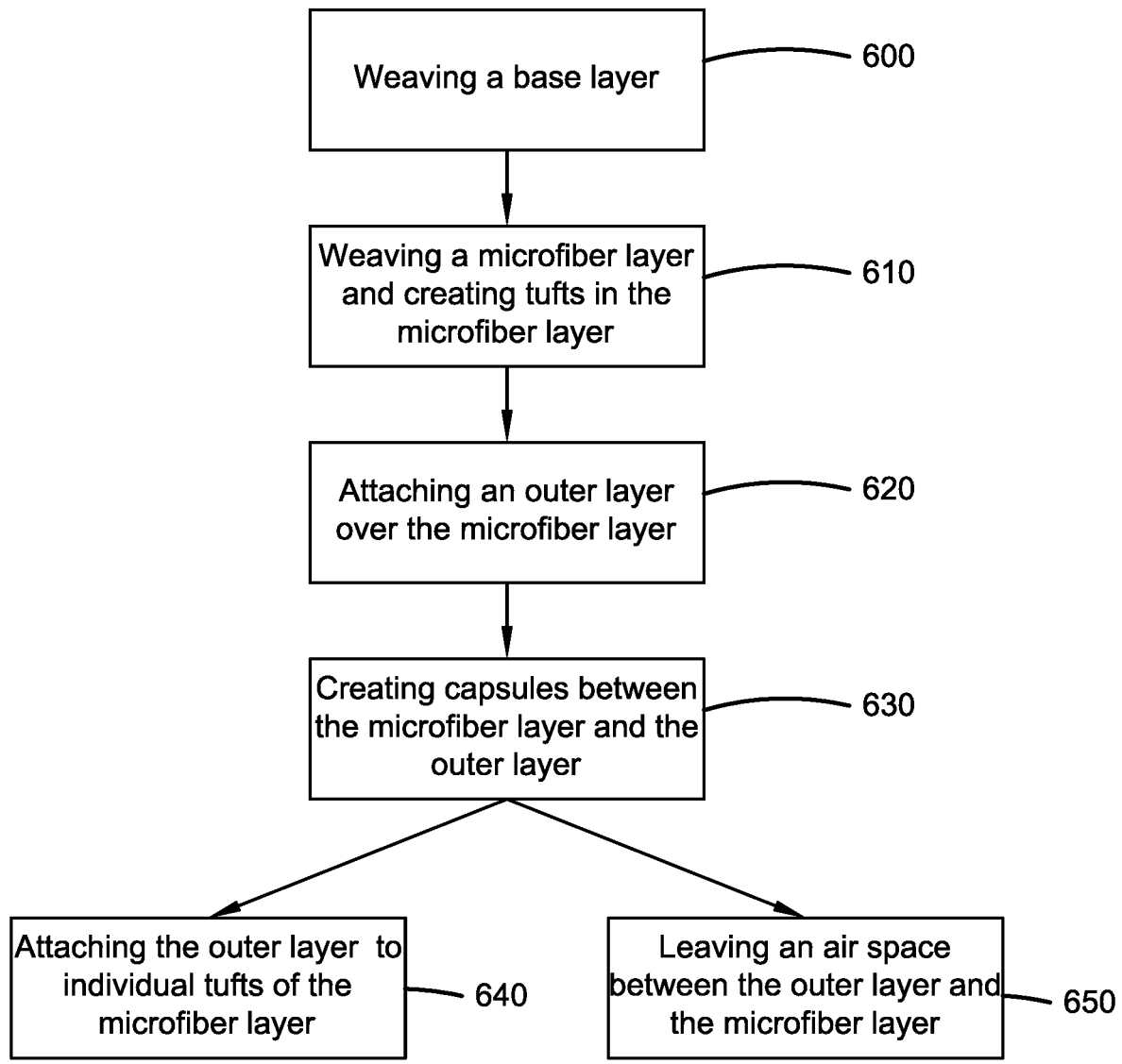
FIG. 6 presents a block diagram of one potential method of manufacturing the body and hair towel of the present invention in accordance with the disclosed architecture.

FIG. 6 presents a block diagram of one potential method of manufacturing the body and hair towel 100 of the present invention in accordance with the disclosed architecture. More specifically, the base layer 104 of the towel is woven at step 600, and the microfiber layer 200 is woven or attached to the base layer 104 and tufts are created in the microfiber layer 200 creating individual fibers extending upwardly from the base layer 400 at step 610. Then, at step 620, an outer layer 300 is attached over the microfiber layer 200. At step 630, capsules 102 are created that include the outer layer over the inner layer. Next, at step 640 the outer layer 300 is bonded or woven to the microfiber layer, or, alternatively, at step 650 an air space or gap 101 is created between each of the microfiber tufts and the corresponding outer layer 300.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "silk body and hair towels", "body and hair towel", "silk-based towel", "moisture absorbent towel" and "novel body and hair towel" are interchangeable and refer to the body and hair towel 100 of the present invention.

Notwithstanding the forgoing, the body and hair towel 100 of the present invention and its various components can be of any suitable size and configuration as is known in the art without affecting the overall concept of the invention, provided that it accomplishes the above stated objectives. One of ordinary skill in the art will appreciate that the size, configuration and material of the body and hair towel 100 as shown in the FIGS. and its various components are for illustrative purposes only, and that many other sizes and shapes of the body and hair towel 100 and its components are well within the scope of the present disclosure. Although the dimensions of the body and hair towel 100 and its components are important design parameters for user convenience, the body and hair towel 100 and its components may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A towel comprising:
   a base layer having a base layer surface comprising a longitudinal warp yarn, a transverse weft yarn drawn through and inserted over-and-under the longitudinal warp yarn; and
   a plurality of capsules each attached to and extending upwardly from the base layer surface; and
   wherein each capsule comprises a microfiber layer woven to the base layer surface and a silk layer disposed over the microfiber layer; and
   wherein each capsule is triangular or trilobal in cross-section; and wherein the towel has a density of between 500 and 700 grams per square meter; and
   wherein the microfiber layer has a coefficient of friction of between 0.6-0.8 and the silk layer has a coefficient of friction ranging from 0.3-0.7, but is less that the microfiber coefficient of friction.

2. The towel as recited in claim 1, wherein microfiber layer comprises a plurality of fibers each finer than one denier or decitex per thread and a diameter of less than ten micrometers, and further wherein the plurality of fibers are comprised of a select one of a polyester, a polyamide and a polypropylene.

3. The towel as recited in claim 1, wherein each of the plurality of capsules has an outer layer of silk and an inner layer of a microfiber material.

4. The towel as recited in claim 3, wherein each of the plurality of capsules includes an air space between the outer layer of silk and the inner layer.

5. The towel as recited in claim 3, wherein the silk layer comprises a plurality of fibers each ranging from between 1.1 to 1.4 inches in length and having a triangular or trilobal shape configured to refract light.

* * * * *